United States Patent [19]

Harder, Jr. et al.

[11] 4,118,062

[45] Oct. 3, 1978

[54] CANTILEVERED SEAT-SUPPORTING SHELL WITH BUILT-IN BLOWER

[75] Inventors: Arthur J. Harder, Jr., Franklin Park; Norman J. Kehl, Elk Grove Village, both of Ill.

[73] Assignee: Coach and Car Equipment Corporation, Elk Grove Village, Ill.

[21] Appl. No.: 801,841

[22] Filed: May 31, 1977

[51] Int. Cl.² .......................... B60N 1/02; A47C 7/02
[52] U.S. Cl. ..................................... 296/63; 297/451; 98/2.03
[58] Field of Search ................ 296/63, 91, 1 R, 28 R; 297/451, 454; 98/2.03

[56] References Cited

U.S. PATENT DOCUMENTS

| 3,897,974 | 8/1975 | Barecki | 297/451 |
| 3,944,283 | 3/1976 | Molzon | 296/63 X |

*Primary Examiner*—Philip Goodman
*Attorney, Agent, or Firm*—Merriam, Marshall & Bicknell

[57] ABSTRACT

A seat in a mass transit vehicle is supported by a shell cantilevered from a side wall of the vehicle interior. The shell comprises a pair of horizontally extending frame members and a trough-shaped structural skin. A blower is mounted within the housing defined by the skin to blow conditioned air through an opening in the bottom of the skin. A deflector is rotatably mounted on the outside of the skin. Vanes on the deflector deflect air blown through the opening in a direction determined by the position to which the deflector has been rotated.

9 Claims, 7 Drawing Figures

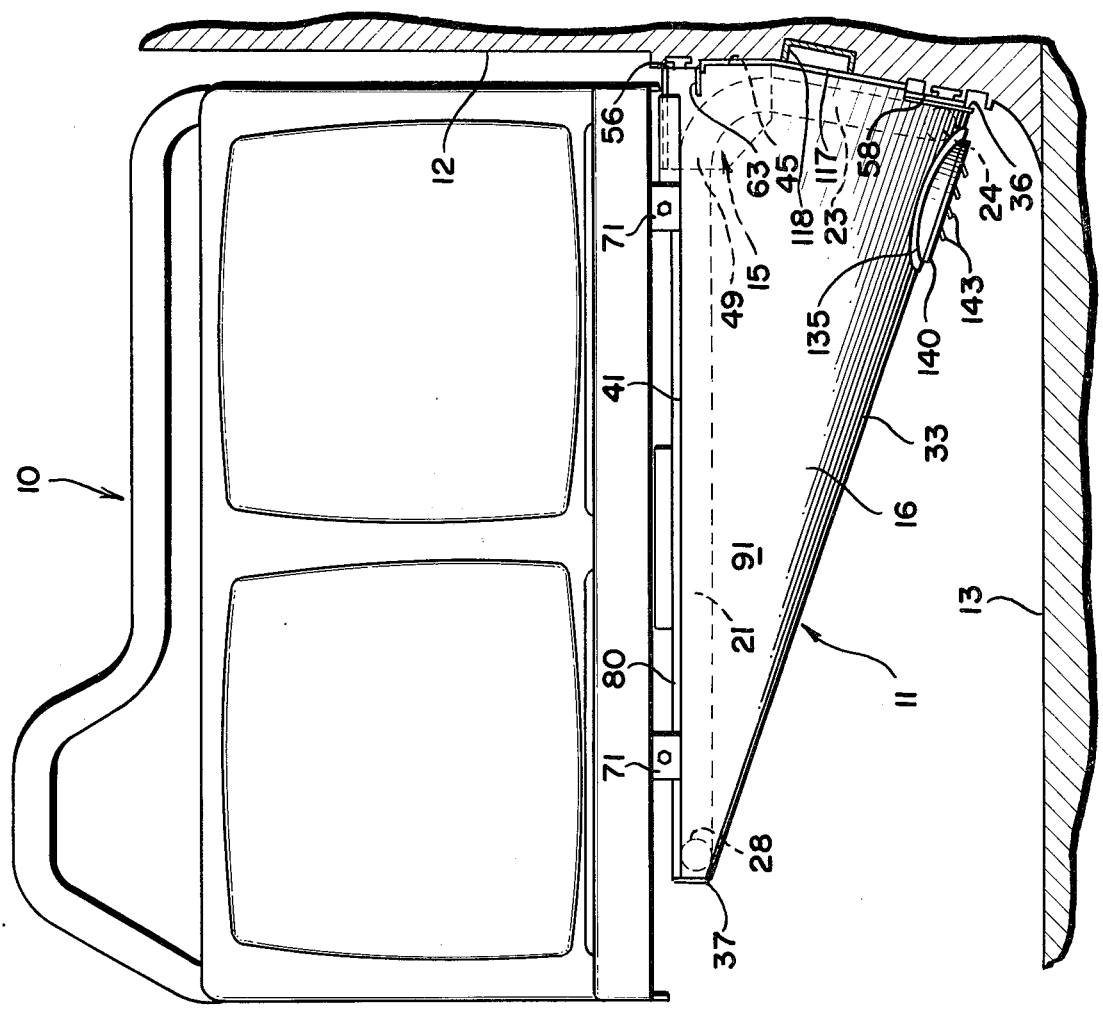
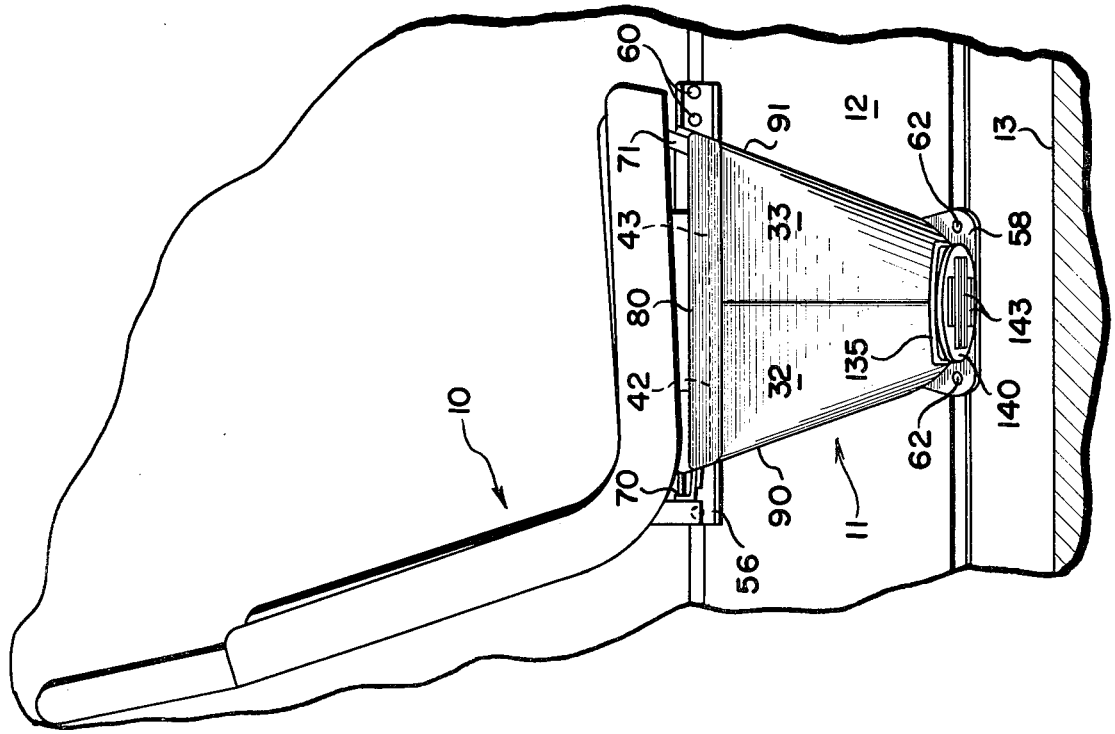

CANTILEVERED SEAT-SUPPORTING SHELL WITH BUILT-IN BLOWER

BACKGROUND OF THE INVENTION

The present invention relates generally to seats for mass transit vehicles, such as buses, and more particularly to cantilevered seats having blowers located below the seats for blowing into the interior of the vehicle air of controlled temperature or humidity.

Conventional cantilevered seats for mass transit vehicles are shown in Barecki U.S. Pat. No. 3,897,974. These seats are supported by a frame structure comprising a pair of horizontal members extending outwardly from a side wall of the vehicle and a pair of diagonal brace members extending diagonally outwardly and upwardly from the side wall of the vehicle to an outer portion on the outwardly extending horizontal frame members. Other bracing is also provided. The entire frame structure is closed within a housing mounted on the frame structure and supported thereby, and the housing provides no significant supporting function for the cantilevered seat.

The housing is generally trough-shaped with a bottom and a pair of sides, the bottom being inclined upwardly from the side wall of the vehicle to the bottom of the cantilevered seat, per se. The bottom of the housing has an opening through which air may be blown from a blower located within the housing and mounted upon the frame structure therein. Temperature or humidity-conditioned air is blown through the opening in the bottom of the housing in a direction substantially the same as that in which extends the axis of the opening.

Additional bracing is generally required within the housing, as part of the frame structure, to support the blower. The blower is not supported upon the housing which, as noted above, performs no significant supportive function. The additional bracing required to mount the blower within the housing tends to clutter up the interior of the housing and constitutes an additional expenditure for structural components.

Not all cantilevered seats within the transit vehicle are provided with blowers inside the housings underlying the seats. Only enough seats are provided with blowers to provide the necessary volume of air required to condition the temperature or humidity within the vehicle interior. Generally, the blowers are located at spaced locations from the front to the back of the vehicle. However, different locations of the vehicle have different requirements for conditioned air.

For example, the requirements at the front or back of the vehicle, respectively, may not be the same, and each may differ from the requirements near the middle of the vehicle. On vehicles having exits near the rear of the vehicle, requirements at that location are different from the requirements at other locations within the vehicle. Providing a cantilevered seat with a housing having an opening through which air is directed solely in a direction conforming to the axis of the opening, as in conventional seats, provides little flexibility from the standpoint of satisfying the different conditioned-air requirements at different locations in the vehicle.

SUMMARY OF THE INVENTION

The drawbacks of the conventional arrangement for supplying conditioned air from within the housings underlying cantilevered seats in mass transit vehicles are eliminated by embodiments of structure in accordance with the present invention.

A cantilevered seat in accordance with the present invention utilizes a pair of frame members extending horizontally outwardly from the vehicle side wall together with a trough-shaped, structural skin located primarily below the horizontally disposed frame members and integral therewith to form a shell. This structural skin and the frame members cooperate to support the seat in cantilevered relation to the vertical side wall of the vehicle. The structural skin not only constitutes a supporting member for the cantilevered seat but, also, functions as the housing or enclosure for accessories or eqiupment located below the cantilevered seat. Thus, the blower for conditioned air is located within the structural skin and, because the structural skin is itself a supporting member, the blower may be supported in whole or in part on the structural skin itself. Additional bracing for supporting the blower are not necessary.

Diagonal braces for supporting the horizontally disposed frame members are not necessary because of the cooperation between the frame members and the integral, trough-shaped structural skin.

There is an opening in the bottom of the trough-shaped skin through which conditioned air may be blown, and this opening is provided with a deflector member comprising a plurality of vanes fixed at an angle to the axis of the opening. The deflector member is mounted, on the structural skin, for rotation about the axis of the opening, among a plurality of positions, to change the direction in which the vanes deflect the air blown through the opening, and this feature significantly increases the versatility of the blower. For example, with respect to a seat located across the aisle from the rear exit door of the vehicle, the deflector member can be rotated to a position in which the vanes deflect blown conditioned air directly at the exit so as to overcome the entry of outside air into the vehicle when the exit door is opened.

Similarly, with respect to a blower located beneath a seat near the front of a vehicle, the deflector can be rotated to a position in which the blown air is deflected more towards the rear of the vehicle than towards the front of the vehicle. The opposite effect can be achieved with a blower located below a cantilevered seat located near the rear of the vehicle.

Identical structure is provided for all of these cantilevered seats, the only difference being the position to which the deflector is rotated.

Other features and advantages are inherent in the structure claimed and disclosed or will become apparent to those skilled in the art from the following detailed description in conjunction with the accompanying diagrammatic drawing.

BRIEF DESCRIPTION OF THE DRAWING

FIG. 1 is a side elevational view of a cantilevered seat having a supporting shell with a built-in blower and constructed in accordance with an embodiment of the present invention;

FIG. 2 is a front view of the seat structure illustrated in FIG. 1;

DETAILED DESCRIPTION

Figure 3:
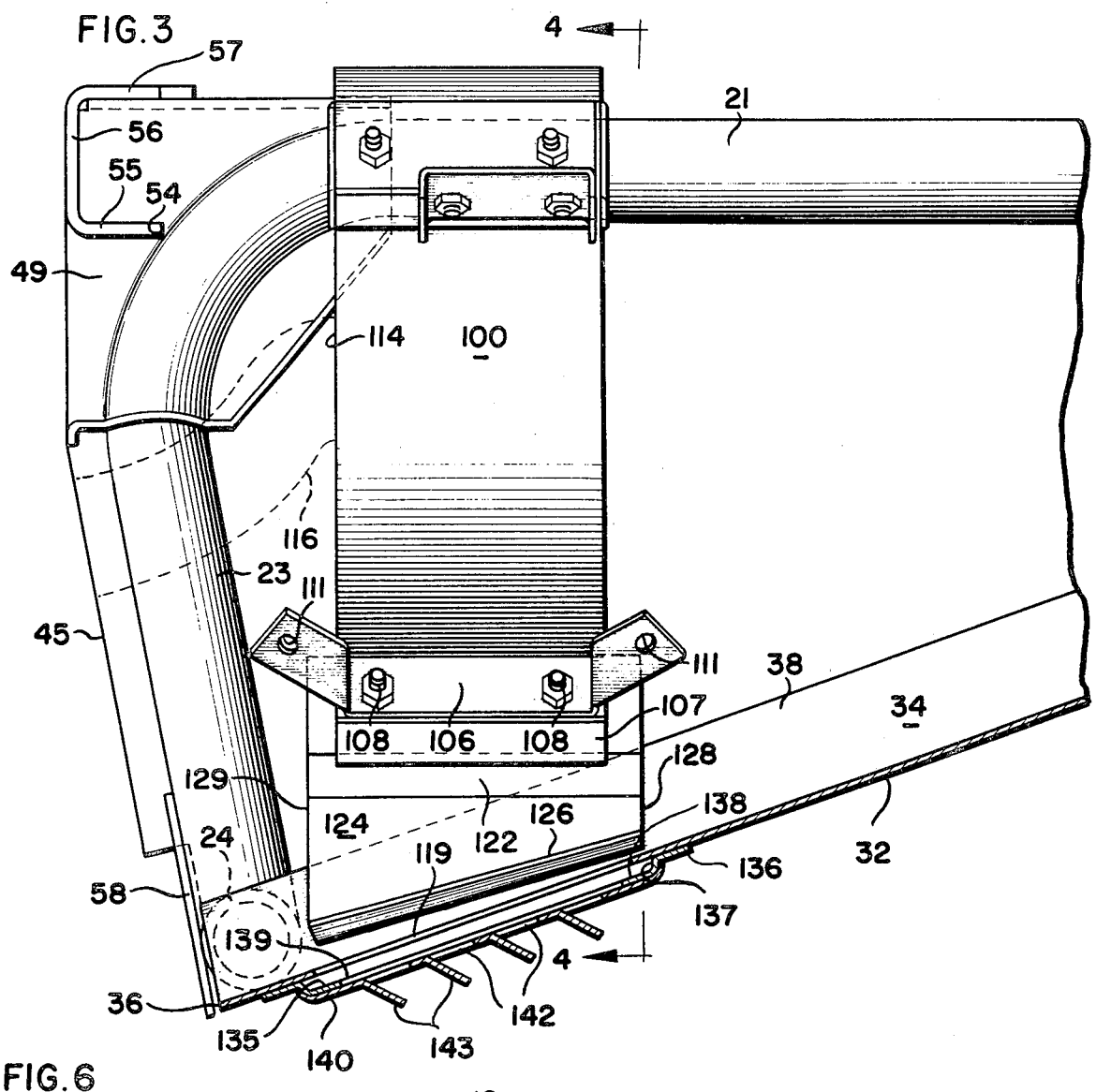
FIG. 3 is an enlarged, fragmentary, sectional view of a portion of the seat-supporting shell with the blower therein.

Referring initially to FIGS. 1 and 2, indicated generally at 10 is a two-passenger seat resting atop a supporting shell indicated generally at 11 and cantilevered from a sidewall 12 of a transit vehicle having a floor 13.

Referring now to FIGS. 1–5, supporting shell 11 includes a tubular frame 15 and a rigid, trough-shaped, structural skin 16 integral with frame 15. Skin 16 is an integral part of the supporting structure, and the skin carries a substantial amount of the load from seat 10.

Tubular frame 15 comprises a pair of horizontally extending frame parts 20, 21 each having an inner end portion integral with the upper end portion of a vertically extending frame part 22, 23 respectively. Extending between vertical frame parts 22, 23 is a lower connecting part 24. Each horizontally extending frame part 20, 21 also comprises an outer end portion between which extends as integral outer connecting part 28.

Each of the horizontally extending frame parts or members 20, 21 are elongated, spaced apart and lie in substantially the same horizontal plane. Each of the vertically extending frame parts or elements 22, 23 are spaced apart and lie in substantially the same vertical plane. The outer connecting part 28 connects together the elongated horizontally extending frame members 20, 21 at their outer ends, and the lower connecting part 24 connects together the vertically extending frame parts 22, 23 at their lower ends.

Figure 7:
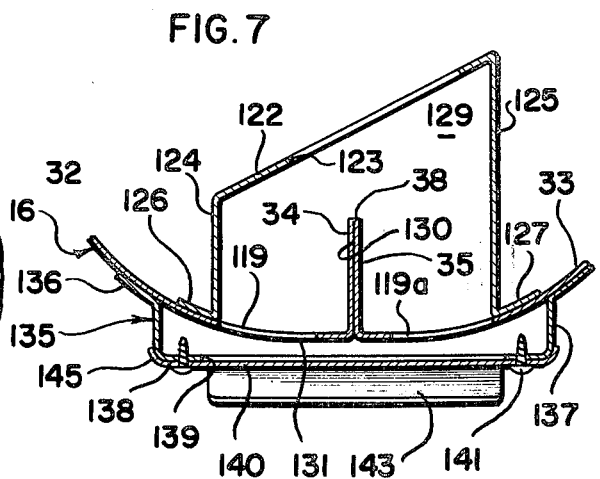
FIG. 7 is a sectional view taken along line 7—7 in FIG. 6.
Figure 4:
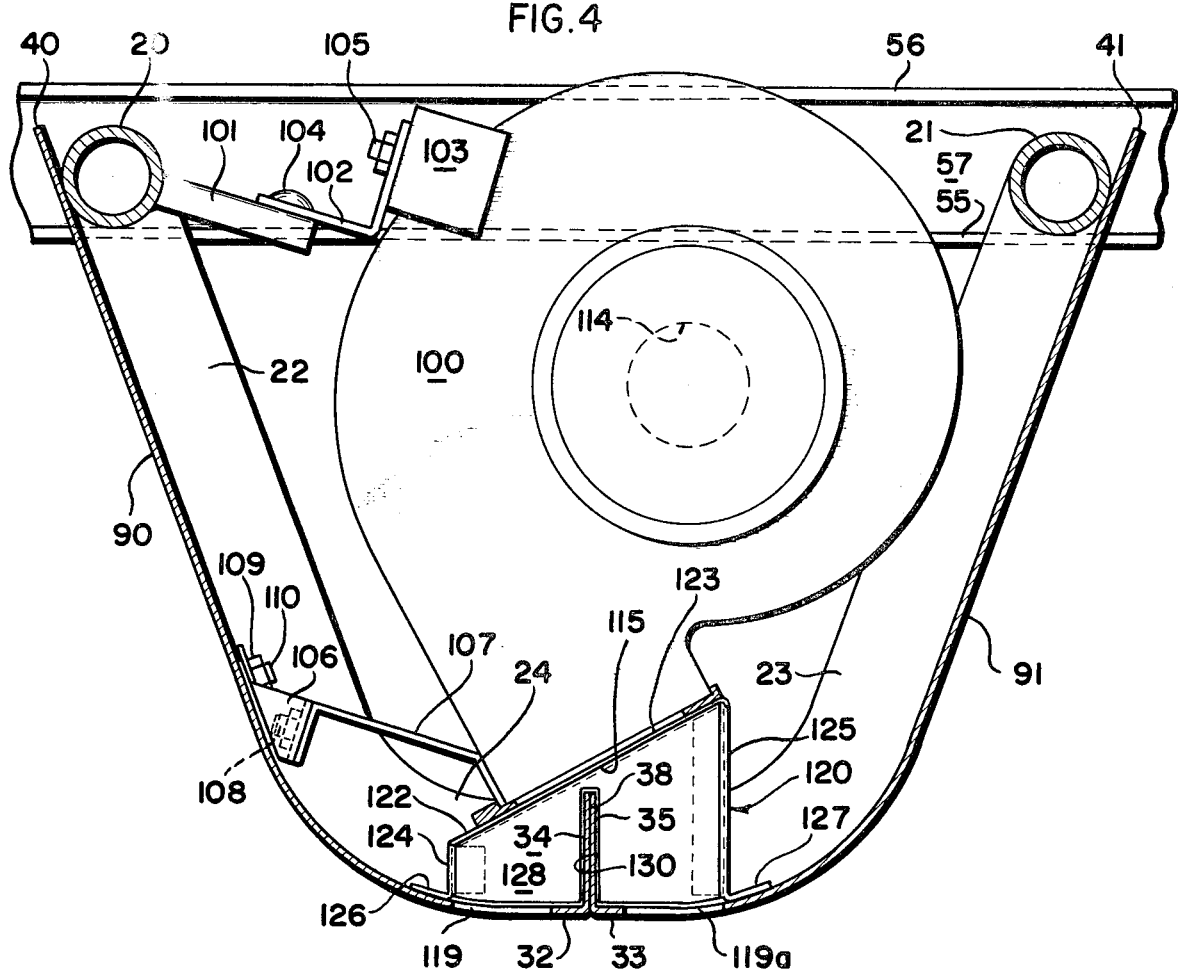
FIG. 4 is a sectional view taken along line 4—4 in FIG. 3.

Trough-shaped skin 16 is composed of two separate halves joined together (FIGS. 4 and 7). Each half comprises a respective side portion 90, 91 integral with a respective bottom portion 32, 33 integral with a respective upstanding lip portion 34, 35. Lip portions 34, 35 are joined together along their length, as by welding, to form a central reinforcing flange 38 extending from a first or inner end 36 of the bottom portion of skin 16 (FIG. 3) to a second or outer end 37 of the bottom portion of skin 16 (FIG. 2).

Figure 5:
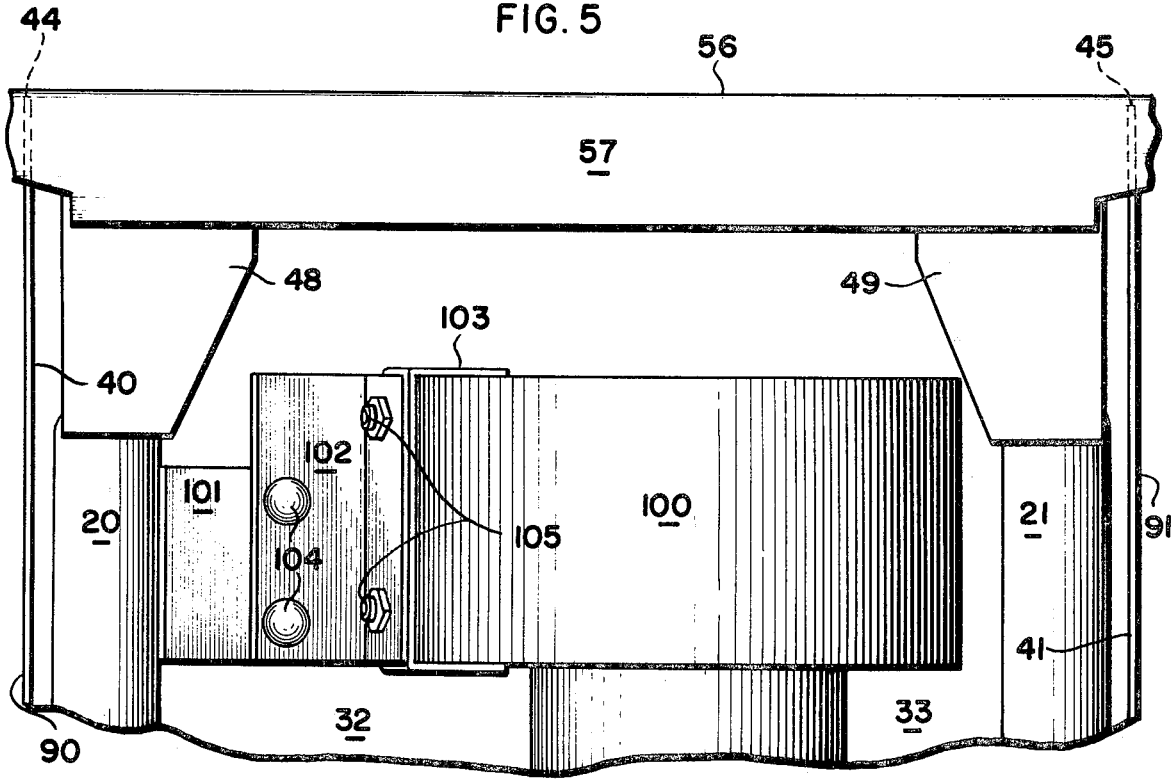
FIG. 5 is an enlarged, fragmentary, plan view of a portion of the seat shell.

Trough-shaped skin 16 has a horizontally disposed, open upper end defined by an upper peripheral edge comprising side edge portions 40, 41 (FIG. 4) and outer edge portions 42, 43 (FIG. 1). Skin 16 also has a vertically disposed open inner end defined by an inner peripheral edge comprising edge portions 44, 45 (FIGS. 2–3 and 5).

Trough-shaped skin 16 is assembled to frame 15 with the skin on the outside of and below the frame. The two are secured together by welding the peripheral edge portions at 40–45 of skin 16 to the adjacent tubular frame parts 20–24 and 28 of frame 15, around both the upper open end and the inner open end of skin 16. The outer end of flange 38 is secured to outer frame part 28 and the inner end of flange 38 is secured to frame part 24 (FIG. 3).

As previously noted, skin 16 is an integral part of the supporting structure. Load is carried on the entire cross-section of skin 16, with a concentration of the load at the reinforcing flange 38 on the bottom of the skin. Aside from outer connecting part 28 and lower connecting part 24 on frame 15, there is no cross-member on the frame, per se, and none is needed. Structural skin 16 will accommodate the forces for which cross-members would be needed in the absence of a structural skin.

Skin 16 is preferably composed of steel sheet (e.g., 20 gauge steel for a shell supporting a two-passenger seat). Frame 15 is preferably composed of steel tubing (e.g., 18 gauge 1¼ inch steel tubing for a shell supporting a two-passenger seat).

Structure for mounting the cantilevered supporting shell on the sidewall of the vehicle will now be described. Welded to tubular frame 15, at the corners where horizontal frame members 20, 21 join vertical frame elements 22, 23, are a pair of gusset elements 48, 49 each the mirror image of the other (FIGS. 3–4).

Each gusset element includes a notch 54 (FIG. 3) for receiving the lower flange 55 of a channel-shaped upper mounting bracket 56 having an upper flange 57 overlying the top of the gusset element (FIG. 3). Referring to FIG. 1, in side portion 91 of skin 16 at its inner edge is a notch 63 for receiving the lower flange 55 of channel-shaped mounting bracket 56. A similar notch is located in the skin's side portion 90 at inner edge 44.

Attached to lower frame parts 24, 25 is a plate-shaped lower mounting bracket 58.

Channel-shaped upper bracket 56 is secured to the wall of the vehicle with fasteners 60, and plate-shaped lower bracket 58 is secured to the wall of the vehicle with fasteners 62 (FIGS. 1 and 2).

Additional details concerning frame 15 and structural skin 16 are contained in the concurrently filed application of Arthur J. Harder, Jr., entitled "Cantilevered Supporting Shell For Seat" and assigned to the assignee of this application. The entire description therein is incorporated herein by reference.

Referring now to FIGS. 3–5, mounted within the housing defined by structural skin 16 is a blower 100. Upper and lower mounting structure for blower 100 will now be described.

Secured to horizontally extending frame member 20, as by welding, is a first upper bracket portion 101 attached to a second upper bracket portion 102 by nuts and bolts at 104. Second upper bracket portion 102 is attached to a third upper bracket portion 103, as by nuts and bolts at 105, and third upper bracket portion 103 is secured to blower 100, as by welding.

Secured to the inner surface of the side portion 90 of skin 16 is a first lower bracket portion 106 connected to a second lower bracket portion 107, as by nuts and bolts at 108. Second lower bracket portion 107 is secured to a bottom portion of blower 100, as by welding. First lower bracket portion 106 may be secured to the inner surface of the stuctural skin by a nut 109 engaging around a bolt 110 passing through an opening 111 in first lower bracket portion 106, with the head of bolt 110 being secured to the inner surface of the structural skin, as by welding.

Referring to FIGS. 2 and 3, blower 100 has an inlet at 114 and an outlet at 115 for circulating air. Inlet 114 may communicate with one end of a first conduit (dotted lines 116 in FIG. 3) for communicating the blower inlet with an opening in vertical side wall 12 of the vehicle (FIG. 2). Opening 117 in turn communicates with a duct 118 extending within vehical side wall 12.

Conduit 116 is not absolutely necessary, but certain advantages are provided by its use. If vehicle sidewall opening 117 merely communicated with the interior of the housing defined by skin 16, and blower 100 sucked air through inlet 114 from within the housing, there would be leakage around the periphery of the housing, of air entering the housing from sidewall opening 117. This leakage would be especially prevalent between sidewall 12 and the edges 44, 45 of skin 16. Leakage of air entering the housing from opening 117 is minimized by directly connecting opening 117 with inlet 114 of blower 100 through conduit 116.

Blower outlet 115 is located directly above a pair of slot-like openings 119, 119a in the bottom of structural skin 16. Extending between blower outlet 115 and bottom openings 119, 119a is an additional conduit 120 in the form of a plenum which directly connects blower outlet 115 with bottom opening 119.

Referring to FIGS. 3, 4 and 7, plenum 120 comprises a top wall 122 having an opening 123. The plenum also comprises a pair of end walls 124, 125 from the bottom of which extend respective flanges 126, 127 resting on the bottom of structural skin 16, alongside the outer edges of bottom openings 119, 119a. Plenum 120 further comprises a pair of side walls 128, 129 each having a narrow, vertical slot 130 for receiving vertically disposed flange 38 on structural skin 16. Plenum 120 has an open bottom end 131 communicating with openings 119, 119a in the bottom of structural skin 16.

Figure 6:
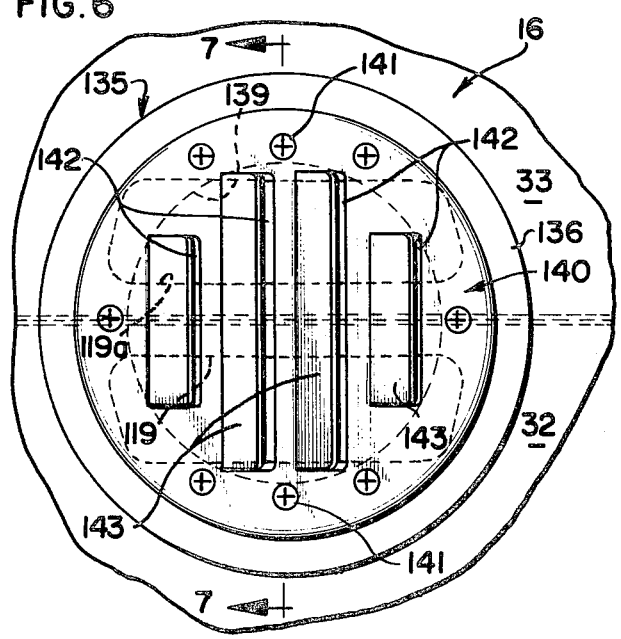
FIG. 6 is a fragmentary bottom view of the deflector member on the trough-shaped structural skin.

Air is blown by blower 100 sequentially through blower outlet 115, through upper opening 123 in plenum 120, through the open bottom end 131 of plenum 120 and through openings, 119, 119a in the bottom of the structural skin. Communicating with openings 119, 119a is deflecting structure now to be described, with reference to FIGS. 3, 6 and 7.

Attached to the bottom portions 32, 33 of the structural skin and encircling openings 119, 119a is a deflector-mounting member 135 comprising an upper peripheral flange portion 136 secured to structural skin 16 and integral with a depending tubular portion 137 terminating at a bottom portion 138 having an opening 139 aligned with openings 119, 119a in the bottom of the structural skin.

Rotatably mounted on member 135 is deflector member 140 comprising a peripheral rim 145 which overlaps member 135 to facilitate rotation thereon. Deflector member 140 includes a plurality of elongated slots 142 underlying openings 119, 119a, in the bottom of the structural skin, and underlying opening 139 in mounting member 135.

Located alongside one edge of each slot 142, and extending at an angle relative to the axis of the openings 119, 119a and 139, are a plurality of vanes 143 for deflecting air blown outwardly through slots 142. Deflector member 140 is held in place on mounting member 135 by a plurality of screws 141 extending through a corresponding number of aligned openings in deflector member 140 and mounting member 135. Deflector member 140 may be rotated relative to mounting member 135 to change the alignment of the screw openings of the two members and when this is done, the direction in which the vanes 143 extend relative to the axis of the openings 119, 119a and 139 is changed, in turn changing the direction in which the vanes 143 deflect the air blown through the aforementioned openings.

Referring now to FIGS. 1–2, after supporting shell 11 is attached to the sidewall of the vehicle, the open upper end of the supporting shell is closed with a cover 80. Thereafter, seat 10 is mounted atop the supporting shell using brackets 70, 71 respectively located atop horizontally extending frame parts 20, 21. Cover 80 has cut-outs to accommodate brackets 70, 71 on frame parts 20, 21.

Cover 80 prevents dirt, trash and the like from entering the interior of the seat-supporting shell. Cover 80 may be composed of light metal (e.g., aluminum), fiberglass or plastic. Cover 80 does not serve any significant structural function, but merely keeps extraneous material from entering the interior of the supporting shell.

The foregoing detailed description has been given for clearness of understanding only, and no unncessary limitations should be understood therefrom, as modifications will be obvious to those skilled in the art.

What is claimed is:

1. Cantilevered supporting structure for a seat located in a temperature-controlled environment, said structure comprising:
   frame means comprising an upper, horizontally disposed frame portion;
   a trough-shaped, structural skin located primarily below said horizontally disposed frame portion and integral with said frame means to form a shell;
   said shell having a bottom inclined upwardly from its rear to its front end, a pair of sides, an open top and an open rear end;
   means at said open rear end of the shell for mounting said shell on a vertical wall;
   said structural skin and said frame means comprising means cooperating to support a seat in cantilevered relation to said vertical wall;
   means for locating within said shell a blower having an inlet and an outlet for circulating air;
   an opening in the bottom of said structural skin;
   a deflector member on the outside of said opening;
   said deflector member having an axis and a plurality of vane means disposed at an angle to said axis and comprising means for deflecting air blown outwardly through said opening;
   and means mounting said deflector member on said structural skin for movement among a plurality of positions, to change the direction in which said vane means deflect the air blown through said opening.

2. Cantilevered supporting structure as recited in claim 1 and comprising:
   bracket means mounted on said structural skin for supporting said blower.

3. Cantilevered supporting structure as recited in claim 1 and comprising:
   additional bracket means, mounted on said horizontally disposed frame portion, for supporting said blower;
   said bracket means on the structural skin being located below said additional bracket means.

4. Cantilevered supporting structure as recited in claim 1 and comprising:
   first conduit means for communicating said blower inlet with an opening in said vertical wall, to minimize the leakage, around the periphery of said shell, of air entering said shell from the opening in said vertical wall.

5. Cantilevered supporting structure as recited in claim 1 and comprising:
   additional conduit means for communicating said blower outlet with said opening in the structural skin.

6. Cantilevered supporting structure as recited in claim 1 and comprising:
   upwardly disposed flange means extending along the bottom of said trough-shaped structural skin across that part at which said opening is located;

said additional conduit means comprising a plenum with a pair of opposed wall portions each having a slot for receiving said upwardly disposed flange.

7. Cantilevered supporting structure as recited in claim 1 wherein:
   said vane means are angularly fixed on said deflector member;
   and said mounting means for the deflector member comprises means mounting the deflector member for rotation about its axis.

8. Cantilevered supporting structure for a seat located in a temperature-controlled environment, said structure comprising:
   frame means comprising an upper, horizontally disposed frame portion;
   a trough-shaped, structural skin located primarily below said horizontally disposed frame portion and integral with said frame means to form a shell;
   said shell having a bottom inclined upwardly from its rear to its front end, a pair of sides, an open top and an open rear end;
   means at said open rear end of the shell for mounting said shell on a vertical wall;
   said structural skin and said frame means comprising means cooperating to support a seat in cantilevered relation to said vertical wall;
   means for locating within said shell a blower having an inlet and an outlet for circulating air;
   an opening in said structural skin;
   means for directing air from said blower outlet through said opening;
   and bracket means mounted on said structural skin for sporting said blower.

9. Cantilevered supporting structure as recited in claim 8 and comprising:
   additional bracket means, mounted on said horizontally disposed frame portion, for supporting said blower;
   said bracket means on the structural skin being located below said additional bracket means.

* * * * *